(12) United States Patent
Hirano et al.

(10) Patent No.: US 6,909,967 B2
(45) Date of Patent: Jun. 21, 2005

(54) NAVIGATION DEVICE AND ROUTE RETRIEVING DEVICE

(75) Inventors: Hideaki Hirano, Kanagawa (JP); Kazuaki Ishikawa, Kanagawa (JP); Kosuke Koga, Kanagawa (JP); Nobuyuki Takehara, Kanagawa (JP)

(73) Assignee: Xanavi Informatics Corporation, Zama (JP)

( * ) Notice: Subject to any disclaimer, the term of this patent is extended or adjusted under 35 U.S.C. 154(b) by 0 days.

(21) Appl. No.: 10/466,084

(22) PCT Filed: Jan. 11, 2002

(86) PCT No.: PCT/JP02/00127

§ 371 (c)(1),
(2), (4) Date: Jul. 11, 2003

(87) PCT Pub. No.: WO02/055962

PCT Pub. Date: Jul. 18, 2002

(65) Prior Publication Data

US 2004/0064250 A1 Apr. 1, 2004

(30) Foreign Application Priority Data

Jan. 11, 2001 (JP) .......................................... 2001-004248

(51) Int. Cl.⁷ .......................... G01C 21/00; G06G 7/78; G08B 1/123
(52) U.S. Cl. ...................... 701/209; 701/202; 701/206; 701/210; 701/211; 701/213; 340/995.14; 340/995.19
(58) Field of Search ................................ 701/209, 202, 701/206, 210, 211, 212; 340/995.1, 995.14, 995.19, 995.23

(56) References Cited

U.S. PATENT DOCUMENTS

| | | | | |
|---|---|---|---|---|
| 4,086,632 A | * | 4/1978 | Lions | 701/210 |
| 5,715,163 A | * | 2/1998 | Bang et al. | 701/202 |
| 5,787,383 A | * | 7/1998 | Moroto et al. | 701/210 |
| 5,797,106 A | * | 8/1998 | Murray et al. | 701/11 |
| 6,182,008 B1 | * | 1/2001 | Nikiel et al. | 701/202 |
| 6,263,278 B1 | * | 7/2001 | Nikiel et al. | 701/210 |
| 6,266,613 B1 | * | 7/2001 | Nimura et al. | 701/210 |
| 6,346,893 B1 | * | 2/2002 | Hirano et al. | 340/995.23 |
| 6,522,958 B1 | * | 2/2003 | Dwyer et al. | 701/3 |
| 2002/0055818 A1 | * | 5/2002 | Gaspard | 701/209 |
| 2003/0182052 A1 | * | 9/2003 | DeLorme et al. | 701/201 |

FOREIGN PATENT DOCUMENTS

| | | |
|---|---|---|
| JP | 62-95422 | 5/1987 |
| JP | 10-197275 | 7/1998 |
| JP | 10-340045 | 12/1998 |
| JP | 11-83504 | 3/1999 |
| JP | 2000-230833 | 8/2000 |
| JP | 2000-258177 | 9/2000 |
| JP | 2000-337910 | 12/2000 |
| JP | 2000-337914 | 12/2000 |
| JP | 2001-141481 | 5/2001 |
| JP | 2001-296134 | 10/2001 |
| JP | 2002-71369 | 3/2002 |

* cited by examiner

Primary Examiner—Thomas G. Black
Assistant Examiner—Brian J Broadhead
(74) Attorney, Agent, or Firm—Crowell & Moring LLP

(57) ABSTRACT

A navigation device includes: a display device which displays a map; a route search device which searches a route based upon a departure location, an enroute location, and a destination location which have been inputted; an enroute location addition device which adds the enroute location with an enroute location addition screen which is displayed upon the display device; and a display control device which displays the enroute location addition screen with the map upon the display device.

3 Claims, 11 Drawing Sheets

(a)

(b)

(a)

(b)

(a)

(b)

NAVIGATION DEVICE AND ROUTE RETRIEVING DEVICE

The present application is based upon Japanese Patent Application No. 2001-004248 (filed 11 Jan. 2001), and the contents thereof are incorporated herein by reference.

TECHNICAL FIELD

The present invention relates to a navigation device which guides a vehicle according to a route which has been set by route searching, and to a route search method.

BACKGROUND ART

There is a known car navigation device which is endowed with a map display function of displaying a road map of the vicinity of the vehicle position, a route calculation function of calculating a recommended route from a departure location to a destination location, a route guidance function of performing route guidance based upon a recommended route which has been calculated, and the like. The route calculation function also may be endowed with an enroute location addition function of newly adding an enroute location between the departure location and the destination location.

With a prior art enroute location addition function, map display is interrupted and a route editing screen is displayed, and the addition of an enroute location is performed with this route editing screen. Due to this, there is the problem that, when adding an enroute location upon the route, the operability may be bad. In particular, it is extremely troublesome to specify an enroute location to be added for a route with which a user is not familiar.

DISCLOSURE OF THE INVENTION

The present invention proposes a navigation device and a route search method, with which the operability for adding an enroute location is enhanced.

A navigation device according to the present invention comprises: a display device which displays a map; a route search device which searches a route based upon a departure location, an enroute location, and a destination location which have been inputted; an enroute location addition device which adds the enroute location with an enroute location addition screen which is displayed upon the display device; and a display control device which displays the enroute location addition screen with the map upon the display device.

In this navigation device, it is preferred that there are further provided: a designation device which designates a specified ground point upon the map; a selection device which selects any one of a plurality of enroute location addition fields which are provided upon the enroute location addition screen; and an addition control device which adds the specified ground point which has been designated by the designation device to the enroute location addition field which has been selected by the selection device, with the map and the enroute location addition screen being displayed upon the display device.

Also, it is preferred that there are further provided: a map scale change designation device which designates scale change of the map; and a scale change device which changes the scale of the map which is being displayed upon the display device, when map scale change designation has been performed by the map scale change designation device while the map and the enroute location addition screen are being displayed upon the display device.

A route search method according to the present invention comprises: a route search step of searching a route based upon a departure location, an enroute location, and a destination location which have been inputted; an addition determination step of determining that an addition of an enroute location has been designated; and a display step of displaying an enroute location addition screen with a map, when designation of the addition of the enroute location is determined while the map is being displayed upon a display device.

In this route search method, it is preferred that there are further provided: a designation determination step of determining that a specified ground point has been designated upon the map; a selection determination step of determining which of a plurality of enroute location addition fields which are provided upon the enroute location addition screen has been selected; and an addition control step of adding the specified ground point which has been designated by the designation determination step to the enroute location addition field which has been determined by the selection determination step, with the map and the enroute location addition screen being displayed upon the display device.

Also, it is preferred that there are further provided: a scale designation determination step of determining designation of scale change of the map; and a scale change step of changing the scale of the map which is being displayed upon the display device, when the scale designation determination step has determined the designation of scale change while the map and the enroute location addition screen are being displayed upon the display device.

A computer-readable computer program product according to the present invention contains a route search program, and the route search program comprises: a route search instruction of searching a route based upon a departure location, an enroute location, and a destination location which have been inputted; an addition determination instruction of determining that an addition of an enroute location has been designated; and a display instruction of displaying an enroute location addition screen with a map, when designation of the addition of the enroute location is determined while the map is being displayed upon a display device.

In this computer-readable computer program product, it is preferred that the route search program further comprises: a designation determination instruction of determining that a specified ground point has been designated upon the map; a selection determination instruction of determining which of a plurality of enroute location addition fields which are provided upon the enroute location addition screen has been selected; and an addition control instruction of adding the specified ground point which has been designated by the designation determination command to the enroute location addition field which has been determined by the selection determination instruction, with the map and the enroute location addition screen being displayed upon the display device.

Also, it is preferred that the route search program further comprises: a scale designation determination instruction of determining designation of scale change of the map; and a scale change instruction of changing the scale of the map which is being displayed upon the display device, when the scale designation determination instruction has determined the designation of scale change while the map and the enroute location addition screen are being displayed upon the display device.

It is preferred that each of the above computer-readable computer program products is a recording medium upon which the route search program is recorded.

It is preferred that each of the above computer-readable computer program product is a carrier wave upon which the route search program is embodied as a data signal.

BEST MODE FOR CARRYING OUT THE INVENTION

Figure 1:
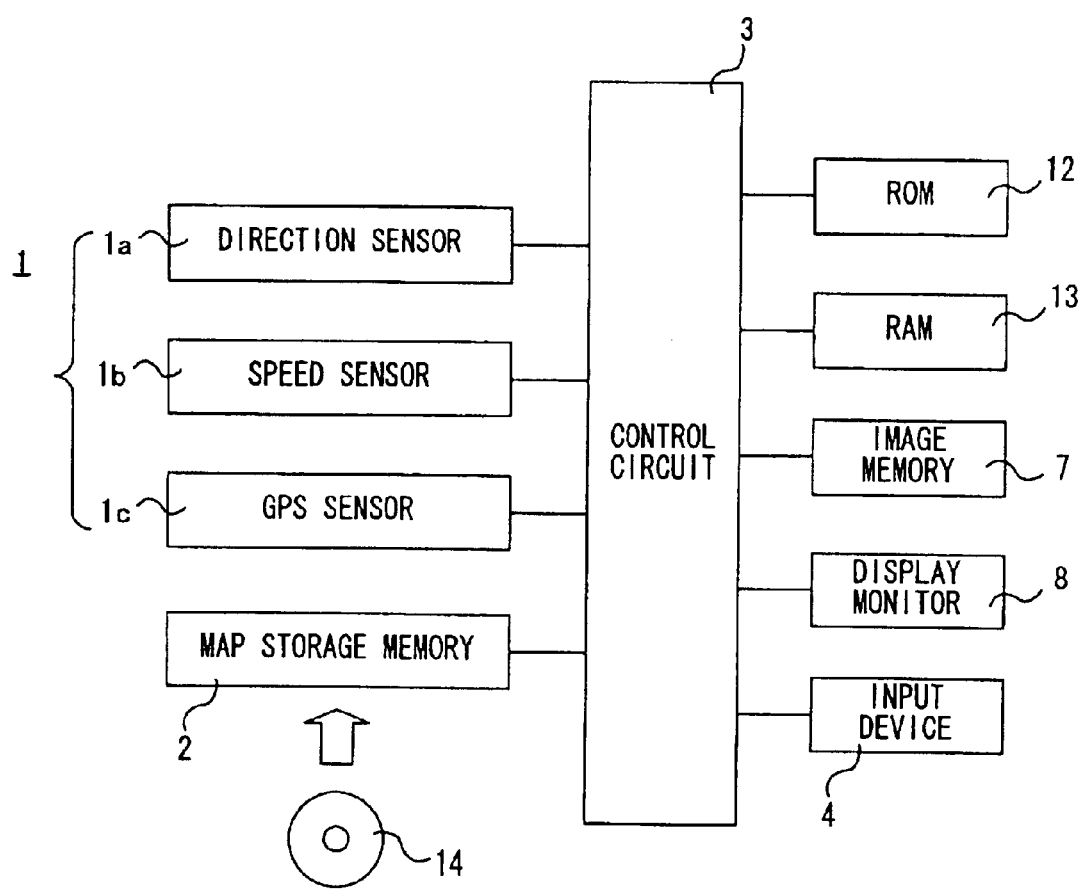
FIG. 1 shows a block diagram of a car navigation device which is an embodiment of the present invention.
Figure 2:
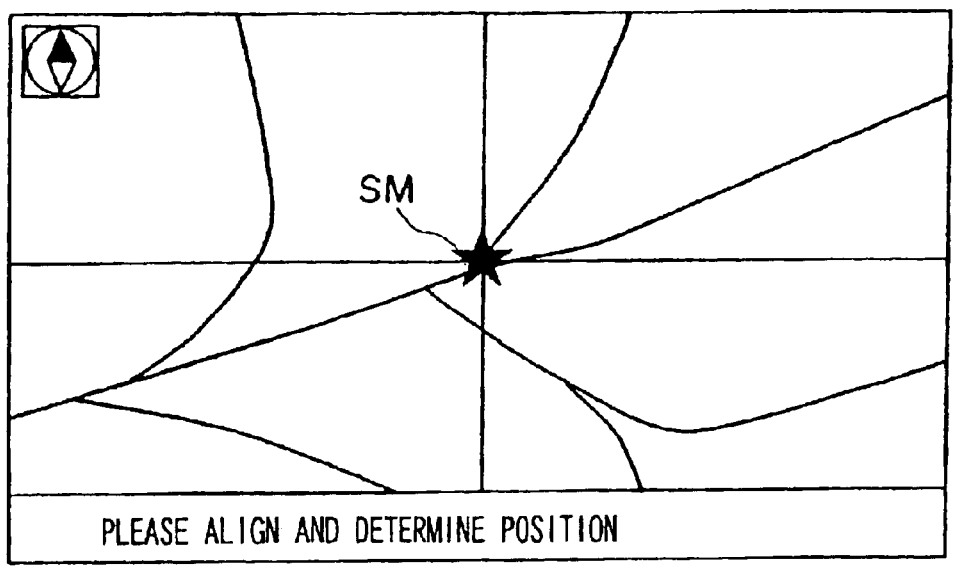
FIG. 2 shows a screen display for explanation of a process of setting a destination location.
Figure 2:
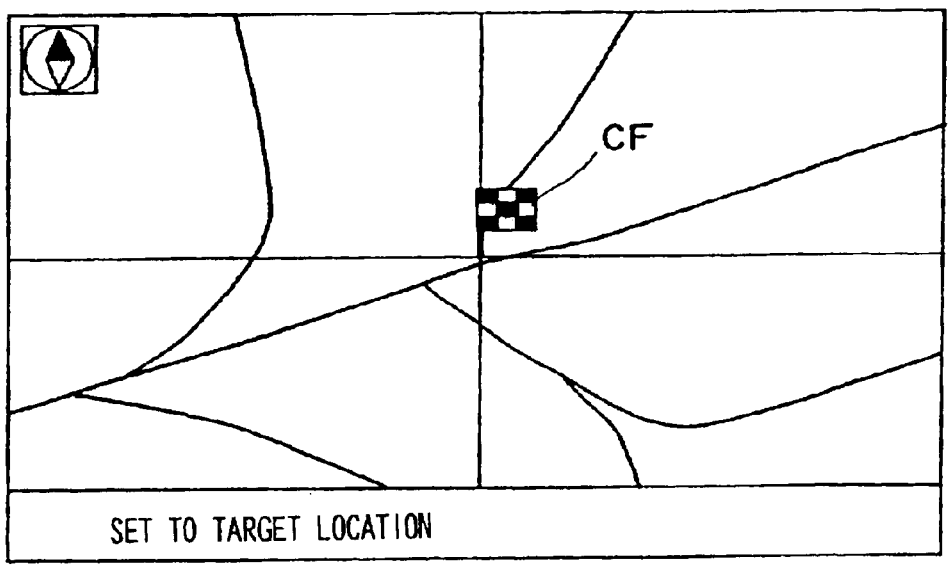
Figure 3:
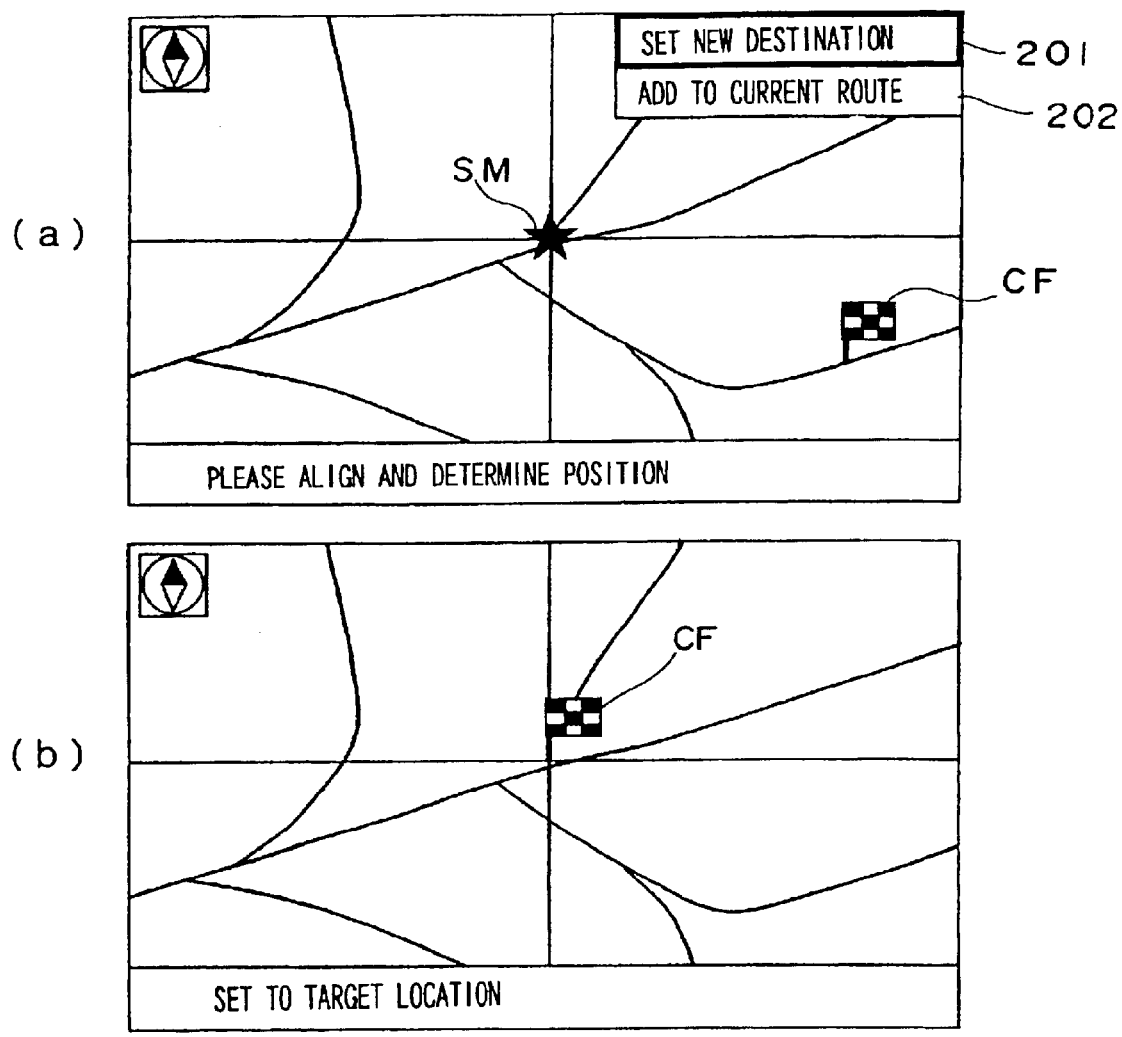
FIG. 3 shows a screen display for explanation of a process of adding an enroute location.
Figure 4:
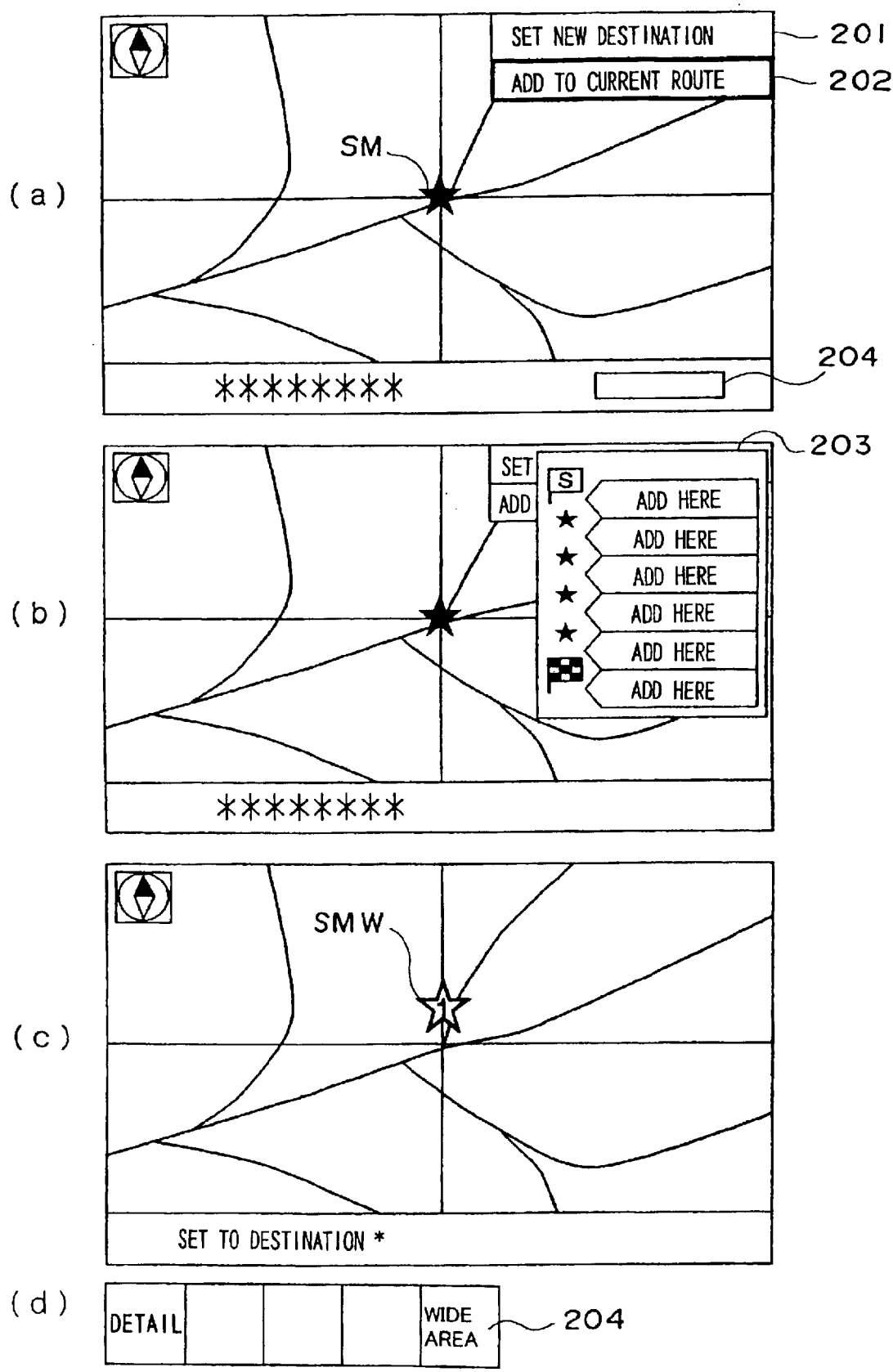
FIG. 4 shows a screen display for explanation of the process of adding an enroute location.

FIG. 1 shows a block diagram of a car navigation device which is an embodiment of the present invention. This car navigation device is endowed with functions of presenting information related to the driving of the vehicle; in concrete terms, with a map display function of displaying a road map of the vicinity of the position of the vehicle, with a route calculation function of calculating a recommended route from a departure location to a destination location, with a route guidance function of performing route guidance based upon a recommended route which has been calculated, and the like. It is a device or an apparatus which performs so called navigation or road guidance.

In FIG. 1, 1 is a current location detection device which detects the current location of the vehicle, and it is made up of, for example, a direction sensor 1a which detects the direction of progress of the vehicle, a vehicle speed sensor 1b which detects the vehicle speed, a GPS sensor 1c which detects GPS signals from GPS (Global Positioning System) satellites, and the like. 2 is a map storage memory which stores road map data, and comprises a CD-ROM 14, which is a recording medium in which the road map data is stored, and a read out device for it. The recording medium is not limited to being a CD-ROM; a magnetic tape or a DVD, or any other recording medium, will also be acceptable.

3 is a control circuit which performs overall control of the device, and this comprises a microprocessor and its peripheral circuitry. The control circuit 3 performs various types of control which will be described hereinafter by executing a control program which has been stored in a ROM 12, with a RAM 13 as a working area. 4 is an input device which comprises various switches which input a destination location for the vehicle and the like. It includes a joystick which performs shifting of a cursor and scrolling of the screen. It should be understood that the input device 4 might also be of a remote control type. Furthermore, touch panel switches may also be provided within the screen.

7 is an image memory in which image data for display upon a display monitor 8 is stored, and this image data is made up from data for drawing a road map and various types of graphic data and the like. The image data which is stored in the image memory 7 is suitably read out and displayed upon the display monitor 8. The road map upon the display monitor 8 can be shrunk or expanded in, for example, 8 steps by actuation of scale buttons which are displayed upon the display monitor 8. In other words, the map can be displayed at the desired scale.

In the navigation device according to this invention, there is also incorporated a route search function of searching out a route based upon a departure location and a destination location which have been inputted. The departure location is the current location of the vehicle, and the destination location and the enroute location (or the intermediate location or the via-point location) can be set as desired. This route search function also includes an enroute location addition function of adding an enroute location on an enroute location addition screen which is being displayed upon the display monitor 8. The enroute location addition screen comprises a plurality of enroute location addition fields, and is displayed while displaying the map upon the display monitor 8. The map and the enroute location addition screen are displayed upon the display monitor 8, and a specified ground point is designated upon the map with, for example, the joystick. When any one of the enroute location addition fields is designated in this state, the name of the ground point which has been specified is added as an enroute location which is displayed in the addition field.

The car navigation device which is structured in this manner performs various types of navigation based upon the position information for the subject vehicle which has been obtained by the current location detection device 1, and upon the road map data which is stored in the map storage memory 2. For example, a road map of the near vicinity of the subject vehicle and the position of the subject vehicle are displayed upon the display monitor 8, and the driver is guided along a route which has been obtained by route searching.

Next, for the car navigation device of this embodiment, the processes of setting a destination location, and of setting (adding) an enroute location, will be explained with reference to FIGS. 2 through 10.

(1) Setting a Destination Location

The screen of FIG. 2(a) is displayed by designating "set destination" of the upper guidance field of the display monitor 8 with the joystick. The screen is scrolled with the joystick, and the star sign SM is aligned to the destination location. When confirming the position by the joystick, if the destination location has not yet been set, as shown in FIG. 2(b), a checkered flag CF is displayed as a destination location mark at the ground point of the star sign.

(2) Changing the Destination Location

The screen of FIG. 2(a) is displayed by designating "set destination" of the upper guidance field of the display monitor 8 with the joystick. The screen is scrolled with the joystick, and the star sign SM is aligned to the destination location. When confirming the position by the joystick, if the destination location is set as described above, the screen display goes to the one shown in FIG. 3(a). Upon the screen of FIG. 3(a), a button 201 "set new destination" and a button 202 "add to current route" are displayed. When the button 201 "set new destination" is selected and is confirmed with the joystick, the screen display goes to the one shown in FIG. 3(b). By doing this, the destination location which was previously set is rewritten to the new destination location. The data of the storage region which corresponds to the destination location of the memory of the control circuit 3 is also rewritten.

(3) Setting (Adding) an Enroute Location

Figure 5:
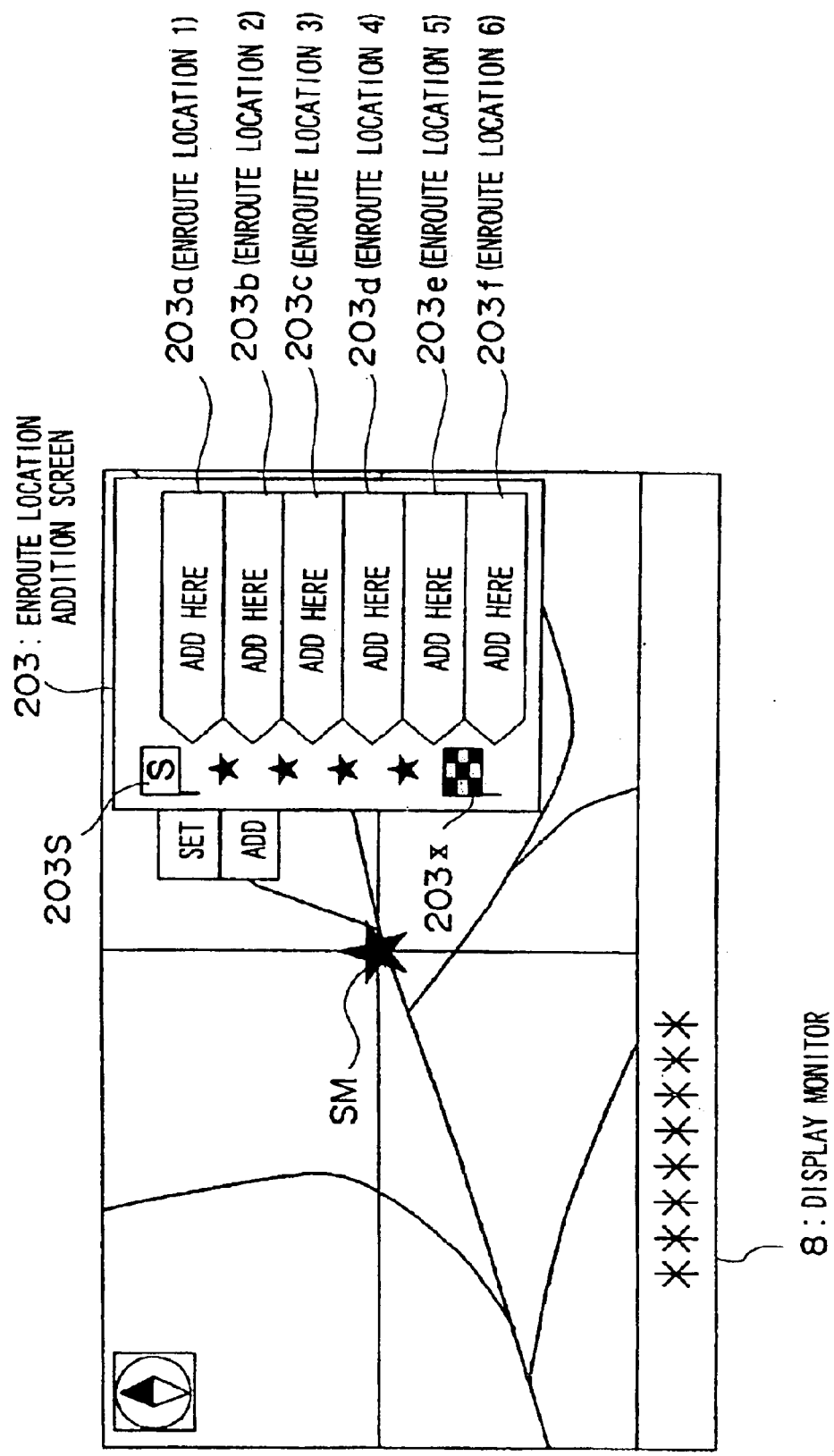
FIG. 5 shows an enlarged version of FIG. 4(b).
Figure 6:
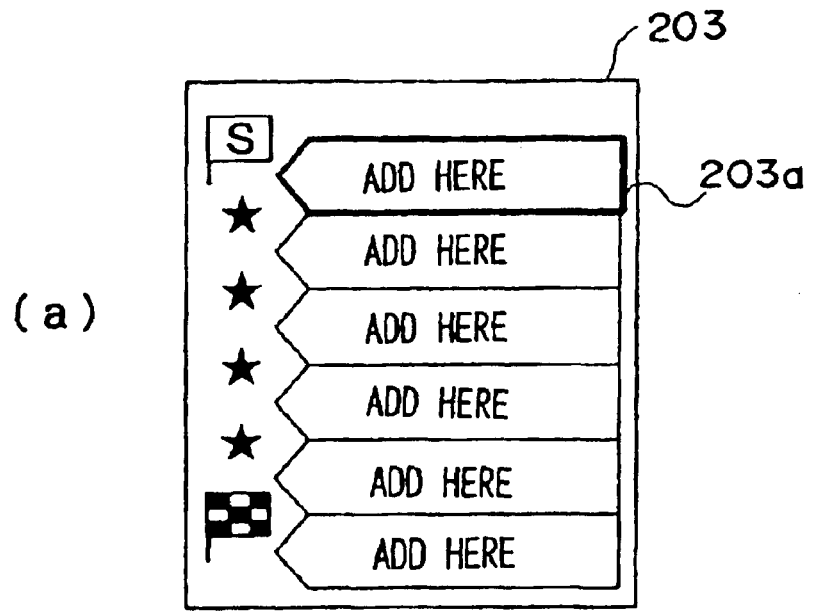
FIG. 6 shows a figure showing the details of an enroute location addition screen.
Figure 6:
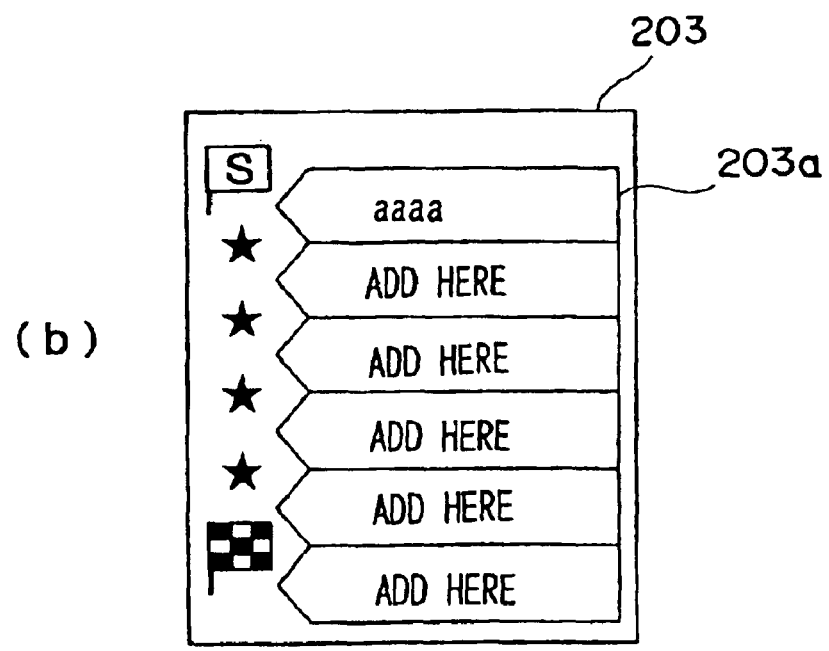
Figure 7:
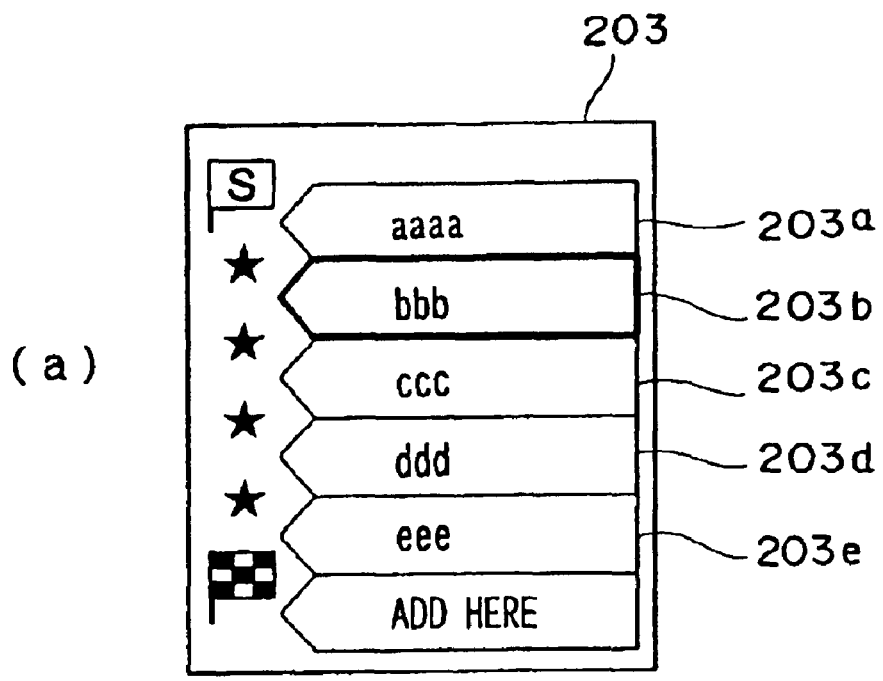
FIG. 7 shows a screen display for explanation of the process of adding an enroute location.
Figure 7:
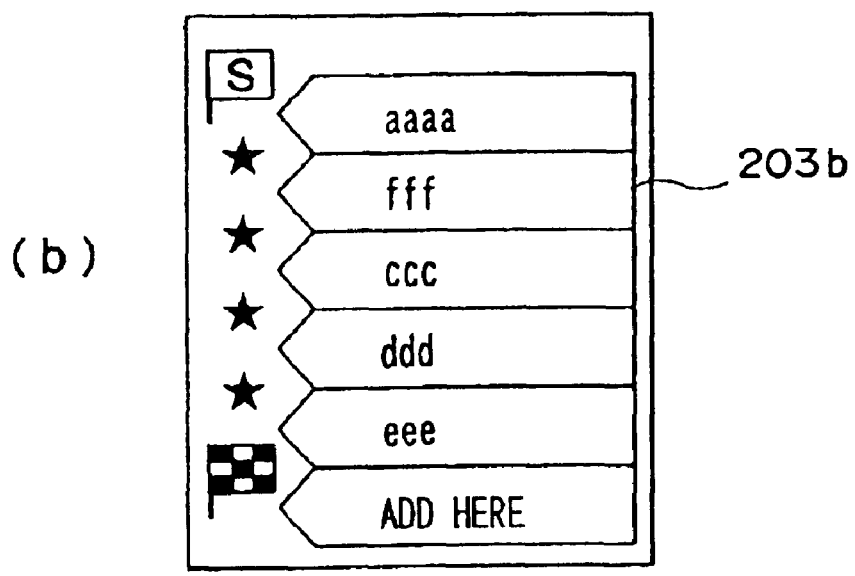

When the button 202 "add to current route" is selected from the screen display of FIG. 3(a) with the joystick, the screen display goes to the one shown in FIG. 4(a). When on the screen of FIG. 4(a) the selection is confirmed with the joystick, an enroute location addition screen 203 is displayed, as shown in FIG. 4(b). FIG. 5 is an enlarged version of FIG. 4(b).

Referring to FIG. 5, upon the enroute location addition screen 203, from the upper left, there are displayed a departure location mark 203S, star signs which are enroute location marks, and a destination location mark 203X. Furthermore, in the fields on its right side, there are displayed enroute location addition fields 203a through 203f. The star sign SM is aligned to a predetermined ground point as shown in FIG. 5, and any one of the enroute location addition fields 203a through 203f is selected with the joystick. For example, if the enroute location addition field 203a is selected, as shown in FIG. 6(a), the enroute location addition field 203a is displayed as highlighted. After this, when the enroute location addition field 203a is confirmed with the joystick, as shown in FIG. 6(b), along with the ground point name aaaa designated by the arrow sign SM being displayed in the enroute location addition field 203a field, also the ground point name aaaa is stored in the corresponding region of the enroute location memory of the control circuit 3. And, as shown in FIG. 4(c), an outline type star sign SMW is displayed upon the map. It should be understood that the "1" inscribed upon the outline type star sign SMW denotes the enroute location 1 of the enroute location addition field 203a.

As shown in FIG. 7(a), it is possible, for example, to change the ground point of the enroute location addition field 203b, even if all of the enroute location addition fields 203a through 203f have been inputted. In other words, the star sign is set to the ground point to which the map is scrolled with the joystick and which is stored in the enroute location addition field 203b, for example, to fff. In this state, as shown in FIG. 7(a), the ground point name bbb of the enroute location addition field 203b is selected with the joystick and is displayed as highlighted, and is confirmed with the joystick. By this actuation, the ground point name of the enroute location addition field 203b is changed to fff, as shown in FIG. 7(b). At the same time, the ground point name data (bbb) of the corresponding region of the enroute location memory of the control circuit 3 is changed to the ground point name data (fff).

Moreover, it is possible to shrink or to enlarge the map display upon the screen display for adding an enroute location as shown in FIG. 4(a) by actuating a scale button 204 shown enlarged in FIG. 4(d). It is possible to change the scale in eight steps with the scale button 204 of FIG. 4(d). When "detail" is selected, the scale for the map display becomes smallest, so that a detailed map is displayed. Conversely, when "wide area" is selected, the scale for the map display becomes largest, so that the map is displayed on a large scale.

Figure 8:
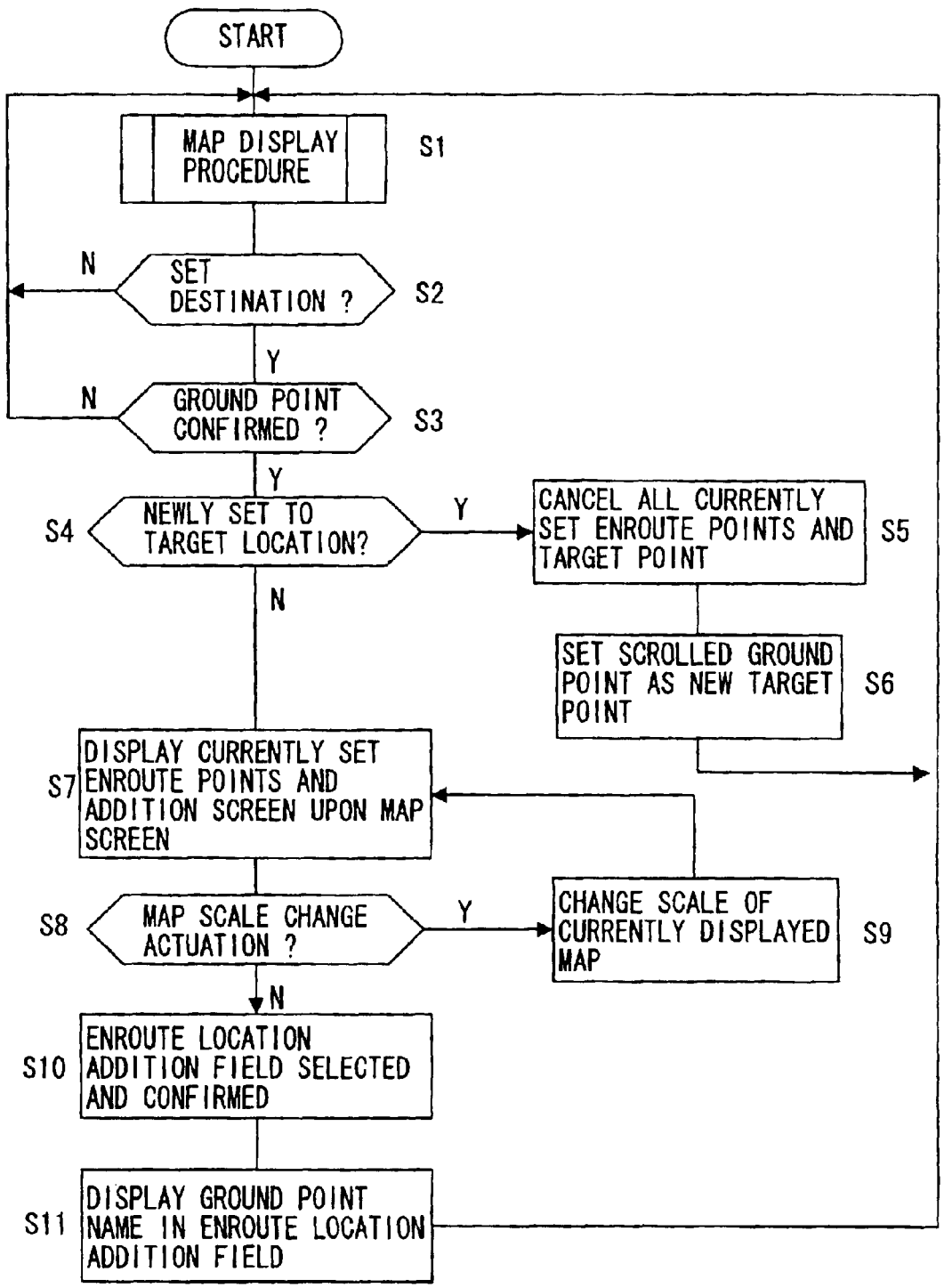
FIG. 8 shows a flow chart for explanation of the process of adding an enroute location.

When setting an enroute location between the departure location and the destination location, which ground point is taken as the enroute location is determined by various factors. However it sometimes happens that it is difficult to determine the enroute location, if the departure location and the destination location are not displayed upon the display screen at the same time. In particular, it can happen that an enroute location is to be set within a route with which a user is not familiar. In this case, by shrinking the map with the scale button 204, in other words by changing the scale to the wide area side, the situation is realized in which both the departure location and the destination location are displayed upon the display screen at the same time. Accordingly, the relative positional relationship of the enroute location with respect to the departure location and the destination location becomes easy to apprehend, so that the work of setting the enroute location becomes easy FIG. 8 is a flow chart for explanation of this type of enroute location addition process. This procedural process is stored in the ROM 12 in the form of a control program which is executed by the control circuit 3. In a step S1 the map display procedure is executed. This map display procedure comprises a display procedure of displaying a road map upon the display monitor 8 with the position of the subject vehicle centered and shifting the position mark of the subject vehicle over the road by scrolling the map each time the vehicle moves a predetermined distance, and a display procedure of scrolling the map by actuation of the joystick with no relationship to the position mark of the subject vehicle. Furthermore, the map display procedure also includes a procedure of changing the scale by shrinking or enlarging the map display according to actuation of the scale button.

When in a step S2 it is decided that the "set destination" button 201 has been selected, the flow of control proceeds to the step S3. Until the "set destination" button 201 is selected, the map display procedure in the step S1 is continued. When the "set destination" button 201 is selected, the star sign SM shown in FIG. 2(a) is displayed in the center of the display monitor 8.

In a step S3, it is decided whether or not the ground point specified upon the map has been designated and confirmed. For example, when the map is scrolled and the star sign SM in the central position upon the screen is aligned to a specified ground point and is confirmed, then a YES decision is made in the step S3 and the flow of control proceeds to a step S4. When in the step S4 the setting of a new destination location is determined, then the flow of control proceeds to a step S5. If the name of the ground point in the region of the memory of the control circuit 3 which corresponds to the destination location is not stored, then a YES decision is made in the step S4. In the step S5, the currently set destination location and enroute locations are all canceled. In other words, the ground point names which are stored in the regions of the memory of the control circuit 3 which correspond to the destination location and to the enroute locations are all canceled. And, in the step S6, the scrolled ground point (the ground point of the star sign SM of FIG. 2(a)) is set as the new destination location. In other words, the ground point name of the star sign is stored in the region of the memory of the control circuit 3 which corresponds to the destination location. When it is determined in the step S4 that no new destination location is being set, then the flow of control proceeds to a step S7, and an enroute location addition screen is displayed. If the ground point name is stored in the region of the memory of the control circuit 3 which corresponds to the destination location, then a NO decision is made in the step S4.

When it is decided in the step S8 that the scale button 204 has been actuated, then in the step S9 the scale of the map which is currently being displayed is changed, and the flow of control returns to the step S7. If it is decided in the step S8 that the scale button 204 is not being actuated, then the flow of control proceeds to the step S10. In the step S10, a decision is made as to whether or not, for example, the addition field 203a of the enroute location addition screen 203 is being selected and confirmed with the joystick. If the decision in the step S10 is YES, then in the step S11, along with displaying the ground point name in the enroute location addition field 203a (refer to FIG. 6(b)), at the same time, the ground point name is stored in the region of the memory 3 of the control circuit which corresponds to the enroute location. If a ground point name is already stored, then it is updated with the new ground point name (refer to FIG. 7(b)).

With the car navigation device according to the present invention, it is arranged to add an enroute location by doing as described above. Accordingly it is not necessary to interrupt the map display and to display a route editing screen for performing addition of an enroute location on this route editing screen as in the prior art, and thus the operability or the quality of actuation when adding an enroute location for a route is enhanced. Furthermore, since it is arranged to be able to alter the scale of the map during the procedure of adding the enroute location, the departure location and the destination location are displayed upon a single screen display, so that the work of specifying an enroute location between these two becomes easy. In particular, it becomes extremely easy to perform the task of adding an enroute location for a route with which a user is not familiar.

It should be understood that, with the car navigation device which has been explained above, as has been explained with regard to the prior art, it is also possible to interrupt the map display and to display a route editing screen, and to perform addition of the enroute location upon this route editing screen.

Figure 9:
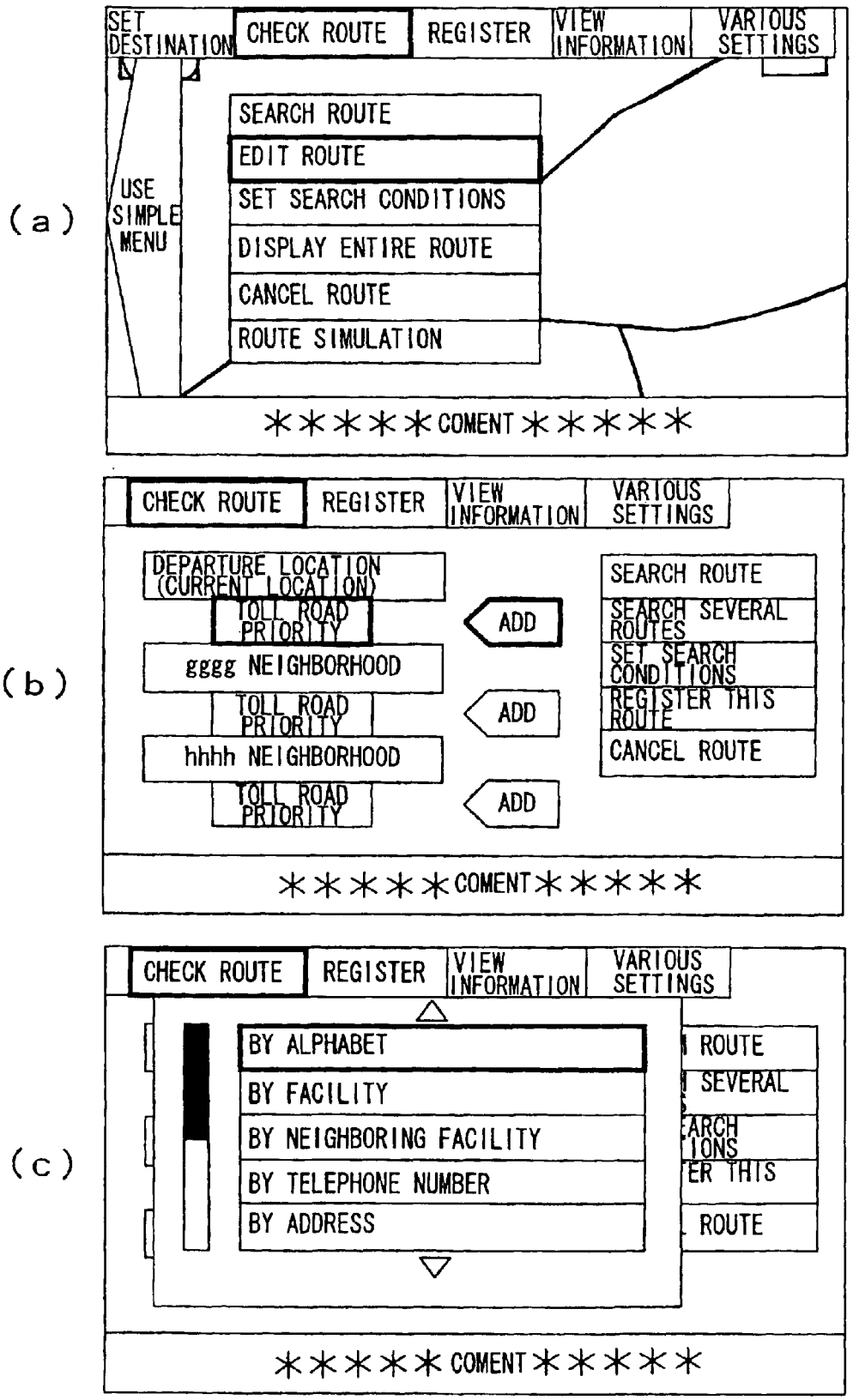
FIG. 9 shows a screen display for explanation of a process of adding an enroute location on a route editing screen.
Figure 10:
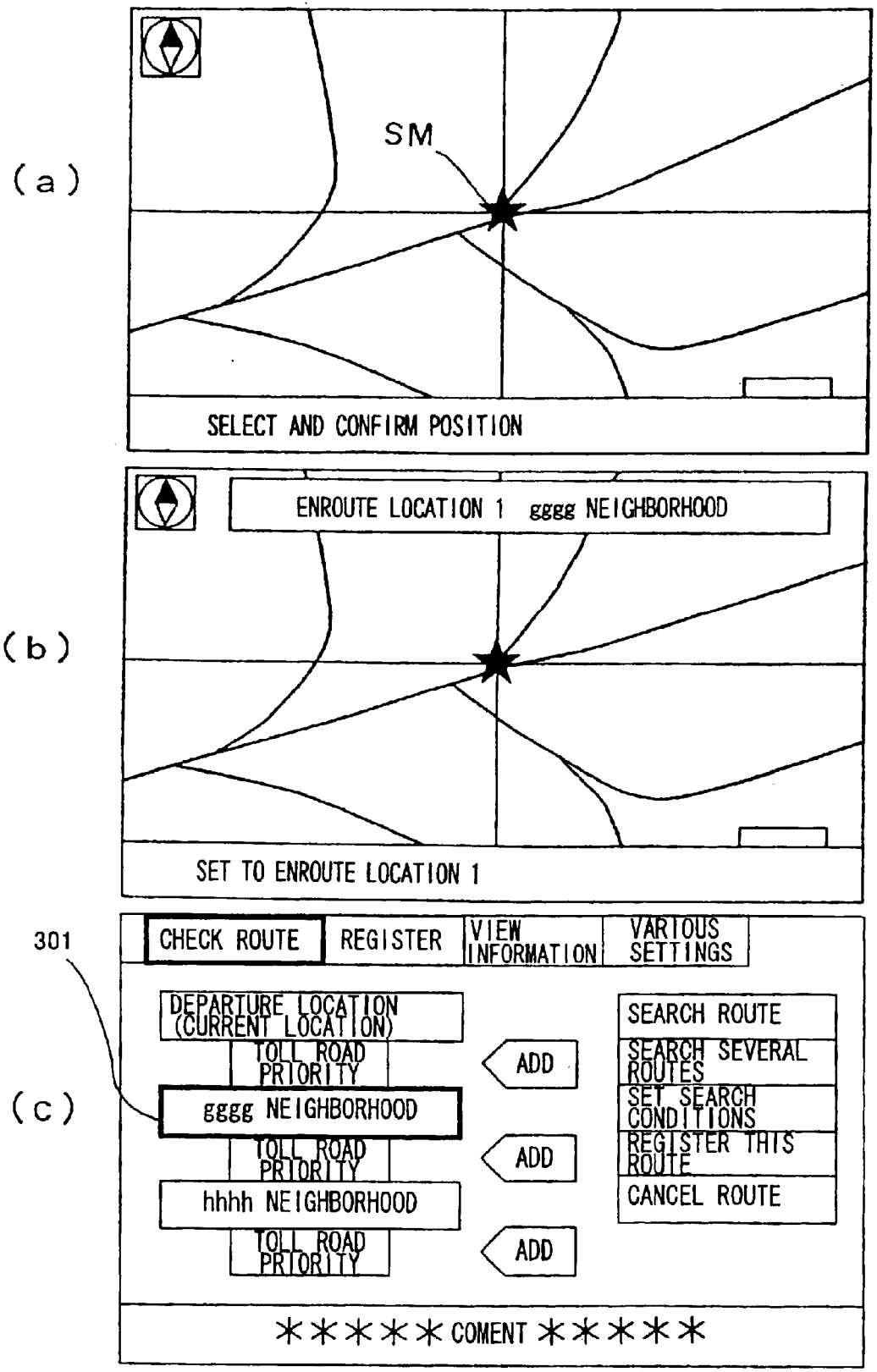
FIG. 10 shows a screen display for explanation of the process of adding an enroute location on a route editing screen.

FIG. 9 is a figure for explanation of the process of adding an enroute location with this route editing screen. The screen of FIG. 9(a) is displayed by designating "check route" in the upper guidance field of the display monitor 8 with the joystick. When "route editing" is selected with the joystick, the screen of FIG. 9(b) is displayed. When "add" is confirmed with the joystick, the screen of FIG. 9(c) is displayed. When for example "by alphabet" is selected with the joystick and any ground point name is inputted and confirmed, along with a map of the vicinity of the ground point name which has been inputted being displayed, the star sign SM is displayed in the center of the screen, as shown in FIG. 10(a).

When the star sign SM is shifted upon the screen of FIG. 10(a) to adjust the position with the joystick, and this is confirmed, then, as shown in FIG. 10(b), "enroute location 1 gggg neighborhood" is displayed in the upper field of the screen, and "enroute location 1 set" is displayed in the lower field of the screen. At the same time, the ground point name is stored in the corresponding region of the enroute location memory of the control circuit 3. And the screen display changes over to the one of FIG. 10(c), and "gggg neighborhood" is displayed in the display field 301 of the enroute location 1 just below the departure location.

In this manner, addition setting of an enroute location is possible, even on the route editing screen with the map display being temporarily interrupted. Accordingly addition actuation of an enroute location becomes possible from both the map screen and the route editing screen, according to the navigation utilization situation, so that the convenience of use is enhanced.

Although, by way of example, in the above described embodiment the explanation was made in terms of a car navigation device, it is not necessarily limited by this detail. It is also possible to apply the present invention to a portable navigation device. Furthermore, it can also be applied to a portable telephone (or a cellular phone) or the like which is endowed with a navigation function. In other words, it is possible to apply the present invention to any device which inputs enroute (intermediate or via-point) locations and a destination location and performs navigation. In this specification, a device which is endowed with a function of navigation is termed a navigation device.

Although in the above described embodiment it was explained, by way of example, that the control program which was executed by the control circuit 3 of the car navigation device was stored in the ROM 12, it is not necessary for it to be limited to this detail. It would also be acceptable for the control program or an installation program for it to be supplied via a recording medium such as a CD-ROM 14 or the like.

Figure 11:
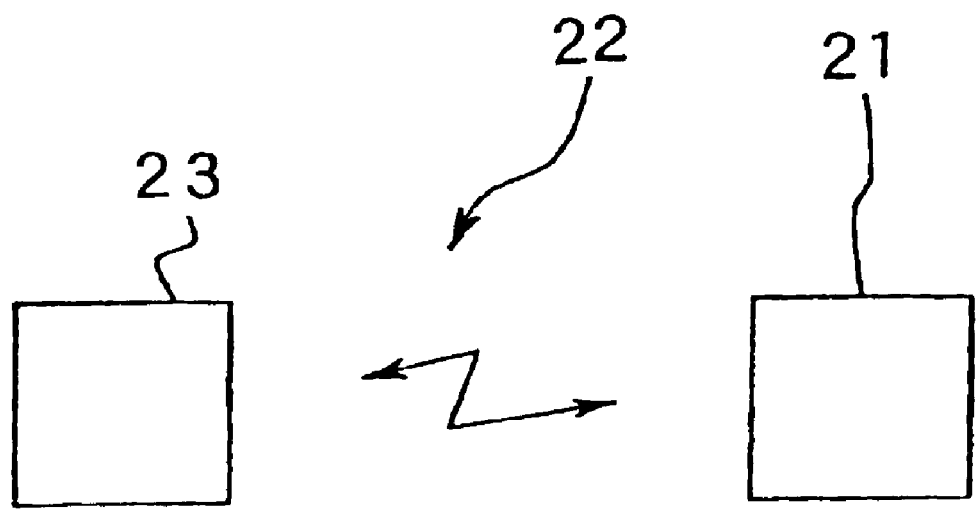
FIG. 11 shows a block diagram when providing a program via a transmission medium.

Furthermore, it is also possible to provide these programs via a transmission medium such as a signal transmission circuit or the like, as represented by the Internet and the like. In other words, it is also possible to transmit the program by converting it into a signal upon a carrier wave which is carried upon a transmission medium. FIG. 11 is a figure which shows this possibility. The car navigation device 21 is the car navigation device which was explained above, and it is endowed with a function of being connected to a transmission or communication circuit 22. A computer 23 is a server computer which provides a control program for the use of the car navigation device 21, and which stores this program. The signal transmission circuit 22 is the Internet, a signal transmission circuit for personal computer signal transmission or the like, or a dedicated signal transmission circuit. And the signal transmission circuit 22 includes a telephone circuit or a wireless telephone circuit such as a portable telephone or the like.

In this manner, the program can be supplied as various types of computer program product which can be read in by a computer, such as a recording medium or a carrier wave.

It should be understood that the car navigation device may also be implemented by executing the above described control program upon a personal computer. In this case, it will be proper to arrange to connect the current location detection device 1 and so on to predetermined I/O ports and the like of the personal computer.

It should be understood that, in the control program, there is included a route search program which includes a route search process of searching a route based upon the departure location, the enroute location, and the destination location which have been inputted, an addition determination process of determining that the addition of an enroute location has been designated, and a display process of, when it is determined that the addition of an enroute location has been designated while a map is being displayed upon the display device, displaying an enroute location addition screen with the map. Furthermore, in this route search program, there are included a designation determination process of determining that a specified ground point has been designated upon the map, a selection determination process of determining which of a plurality of enroute location addition fields which are provided upon the enroute location addition screen has been selected, and an addition control process of adding the specified ground point which has been designated by the designation determination process to the enroute location addition field which has been determined by the selection determination process, with the map and the enroute location addition screen being displayed upon the display device. Furthermore, in the route search program, there are included a scale designation determination means of determining designation of scale change of the map, and a scale change process of changing the scale of the map which is being displayed upon the display device, when the scale designation determination means has determined designation of scale change while the map and the enroute location addition screen are being displayed upon the display device.

What is claimed is:

1. A navigation device, comprising:

a display device;

a route search device which searches a route based upon a departure location, an enroute location, and a destination location which have been inputted;

a display control device which displays a map and an enroute location addition screen for addition of an enroute location upon the display device; and an enroute location addition device which adds an enroute location with the enroute location addition screen which is being displayed upon the display device, the enroute location addition screen including a display which shows a departure location, a display which shows a destination location, and a display of a plurality of enroute location addition fields between the display which shows the departure location and the display which shows the destination location;

a designation device which designates a specified around point upon the map;

a selection device which selects any one of a plurality of enroute location addition fields which are provided upon the enroute location addition screen; and an addition control device which adds the specified around point which has been designated by the designation device to the enroute location addition field which has been selected by the selection device, with the map and the enroute location addition screen being displayed upon the display device.

2. A navigation device according to claim 1, further comprising:

a map scale change designation device which designates scale change of the map; and a scale change device which changes the scale of the map which is being displayed upon the display device, when scale change designation has been performed by the map scale change designation device while the map and the enroute location addition screen are being displayed upon the display device.

3. A navigation device, comprising:

a display device:

a route search device which searches a route based upon a departure location, an enroute location, and a destination location which have been imputed;

a display control device which displays a map and an enroute location addition screen for addition of an enroute location upon the display device;

an enroute location addition device which adds an enroute location with the enroute location addition screen which is being displayed upon the display device; and a designation device which designates a specified ground point upon the map, wherein:

the enroute location addition screen includes a display which shows a departure location, a display which shows a destination location, and a display of a plurality of enroute location addition fields between the display which shows the departure location and the display which shows the destination location; and the display control device, along with displaying the map upon the display device, before displaying the enroute location addition screen, displays a display screen which inquires whether the ground point which has been designated by the designation device is to be a destination location or an enroute location, and displays the enroute location addition screen when it has been selected to be an enroute location.

* * * * *